(12) United States Patent
Ashur

(10) Patent No.: US 10,568,472 B1
(45) Date of Patent: Feb. 25, 2020

(54) PORTABLE TOILET

(71) Applicant: Lee Y. Ashur, Romeoville, IL (US)

(72) Inventor: Lee Y. Ashur, Romeoville, IL (US)

(*) Notice: Subject to any disclaimer, the term of this patent is extended or adjusted under 35 U.S.C. 154(b) by 0 days.

(21) Appl. No.: 16/057,102

(22) Filed: Aug. 7, 2018

(51) Int. Cl.
*A47K 11/02* (2006.01)
*F24F 7/013* (2006.01)
*F21V 33/00* (2006.01)

(52) U.S. Cl.
CPC ............ *A47K 11/02* (2013.01); *F21V 33/004* (2013.01); *F24F 7/013* (2013.01)

(58) Field of Classification Search
CPC ....................................................... A47K 11/02
USPC ............................................................. 4/449
See application file for complete search history.

(56) References Cited

U.S. PATENT DOCUMENTS

| 5,937,452 A * | 8/1999 | Brewer .................. E04H 1/1216 4/460 |
| 6,378,142 B1 | 4/2002 | Gray |
| 2016/0143492 A1* | 5/2016 | Moise ..................... A47K 11/02 4/476 |
| 2017/0260764 A1* | 9/2017 | Izz ......................... E04H 1/1216 |
| 2018/0125187 A1* | 5/2018 | Malavazos ................ A45F 4/04 |

* cited by examiner

*Primary Examiner* — Christine J Skubinna
(74) *Attorney, Agent, or Firm* — Sanchelima & Associates, P.A.; Christian Sanchelima; Jesus Sanchelima

(57) ABSTRACT

The present invention is a portable toilet for children. The portable toilet is in the shape of a backpack for carrying purposes, and which can be popped up as a collapsible tent during use. The portable toilet includes a toilet seat which could be folded to be attached with a body of the portable toilet and later may be removed, and disposed in installed state to be placed inside the portable toilet. The toilet seat is adjustable when in installed state to cater to children with varying heights. The portable toilet further includes a solar panel which is installed on a backside of the body to receive sunlight, when the portable toilet is being carried in transport configuration. The portable toilet also includes a fan and a light bulb which are powered by the solar panel.

12 Claims, 5 Drawing Sheets

PORTABLE TOILET

BACKGROUND OF THE INVENTION

1. Field of the Invention

The present disclosure generally relates to a toilet designed to be used during travelling, and more particularly to a collapsible and portable toilet adapted to be carried for use and to be easily set-up, for example in areas where conventional toilets are not available.

2. Description of the Related Art

Public toilets (also referred to as public restrooms) are often crowded and unsanitary, and may not be suitable for children to use. Generally, in such public toilets there are long queues and one may have to fight through crowd to get access to the toilet, which can make the child and the accompanying adult aggravated. Moreover, when away from home, such public toilets are often difficult to find, which can cause problems, particularly when children are involved. For example, at camps, beaches, and the like, public toilets are often simply not available at all. In some cases, the closest suitable public toilet may be several miles away. Therefore, the use of public toilets cannot be relied upon when travelling. Many times, a child may be forced to go to the toilet in a sub-optimal environment due to lack of any suitable and hygienic toilet facility.

Some portable camping toilets exist, for example in the form of chemical toilets and toilets with disposable receptacles, but such toilets are generally bulky and, as such, can only be implemented when one is travelling in a caravan or the like. Applicant believes a related reference corresponds to U.S. Pat. No. 6,378,142 (hereinafter referred to as "the '142 patent") which describes a foldable privacy screen and portable toilet combination. The '142 patent provides a portable, private toilet having a frame type covered in canvas around three sides of a folding frame supporting a toilet seat. A disposable plastic bag is used under the toilet seat, thus allowing easy cleanup after bathroom duties. The frame is held shut by the use of hook and loop fasteners such as Velcro®. The frame folds flat and is provided with a handle for ease of carrying, storage and transport.

The toilet described in the '142 patent is not portable enough to be carried by a single user, and can only be transported by means of a vehicle or the like. Accordingly, there exists a need in the art to provide a portable toilet which is collapsible to be carried by a user on foot when needed. Other documents describing the closest subject matter provide for a number of more or less complicated features that fail to solve the problem in an efficient and economical way. None of these patents suggest the novel features of the present invention.

SUMMARY OF THE INVENTION

It is one of the main objectives of the present invention to provide a portable toilet which is collapsible and compact to be carried by a user.

It is another objective of the present invention to provide a portable toilet which can be adapted for use by children of different ages.

It is yet another objective of the present invention to provide a portable toilet which allows for ventilation and can provide light to be used in dark hours.

It is still another objective of the present invention to provide a portable toilet which is durable, inexpensive, and easy to set-up and handle.

Further objects of the invention will be brought out in the following part of the specification, wherein detailed description is for the purpose of fully disclosing the invention without placing any limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Illustrative embodiments of the present invention are described below. The following explanation provides specific details for a thorough understanding of and enabling description for these embodiments. One skilled in the art will understand that the invention may be practiced without such details. In some instances, well-known structures, processes and functions have not been shown or described in detail to avoid unnecessarily obscuring the description of the embodiments.

It shall be noted that unless the context clearly requires otherwise, throughout the description, the words "comprise," "comprising," "include," "including," and the like are to be construed in an inclusive sense as opposed to an exclusive or exhaustive sense; that is to say, in the sense of "including, but not limited to." Words using the singular or plural number also include the plural or singular number, respectively while adhering to the concepts of the present invention. Furthermore, references to "one embodiment" and "an embodiment" are not intended to be interpreted as excluding the existence of additional embodiments that also incorporate the recited features.

Figure 1A:
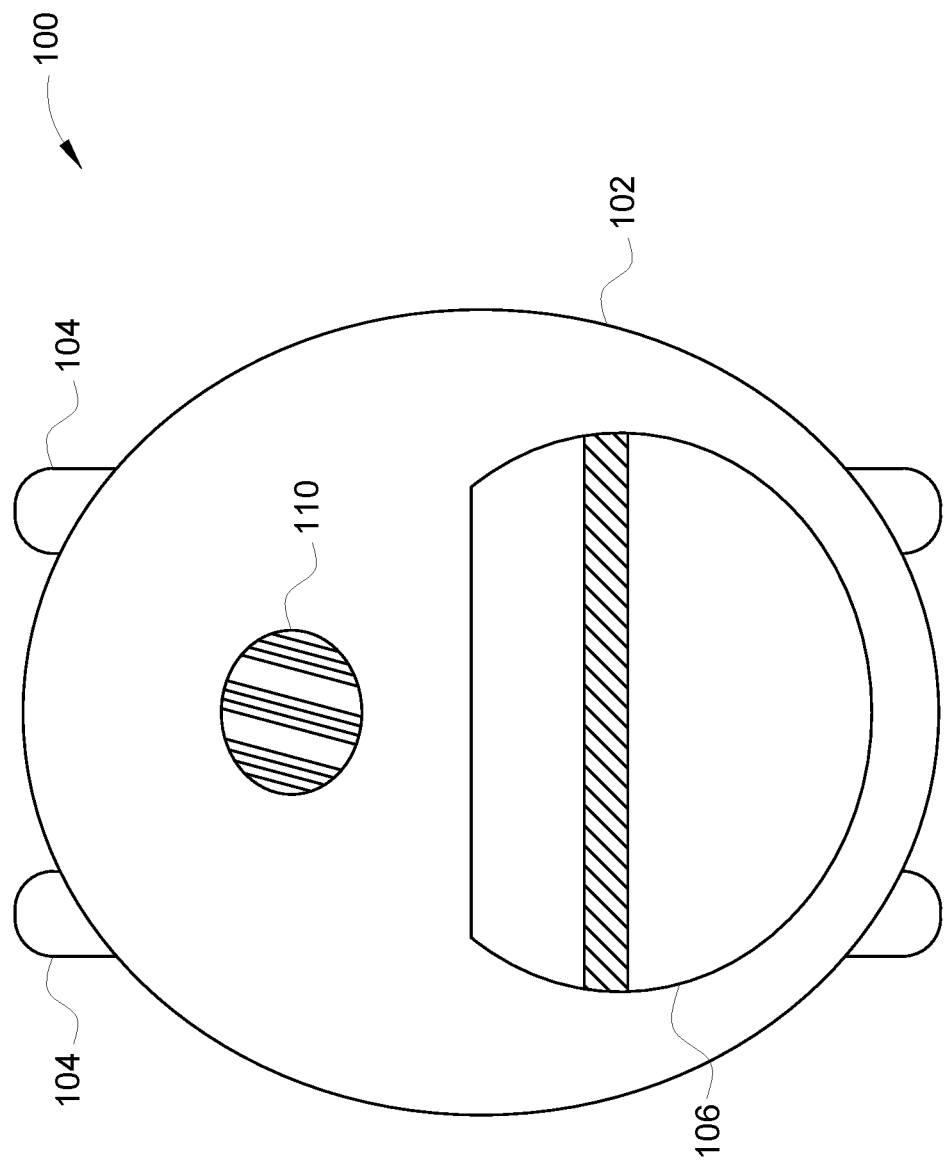
FIG. 1A illustrates a diagrammatic front view of a portable toilet 100 arranged in a transport configuration for carrying purposes, in accordance with one or more embodiments of the present invention.
Figure 1B:
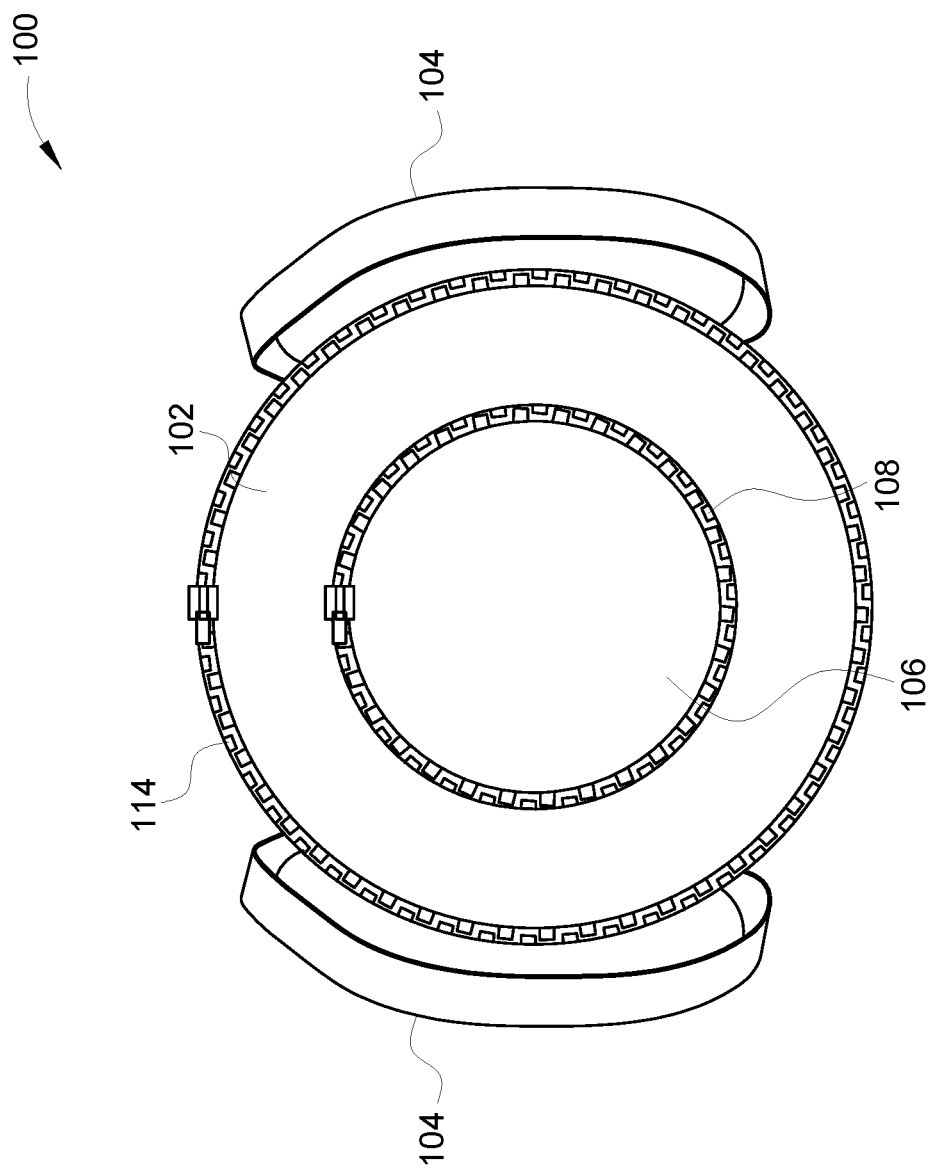
FIG. 1B illustrates a diagrammatic back view of a portable toilet 100 arranged in a transport configuration for carrying purposes, with a toilet seat 106 in a compact state attached thereto, in accordance with one or more embodiments of the present invention.

Referring to the drawings, FIGS. 1A-1B illustrate diagrammatic views of a portable toilet (referred by the numeral 100), in accordance with one or more embodiments of the present invention. In the illustrations, the portable toilet 100 is shown to be in a transport configuration with the assembly being collapsed and folded. In particular, the portable toilet 100 is in the shape of a backpack which could be easily carried from one place to another, for example during travelling. Further, in the illustration of FIGS. 2A-2B, the portable toilet 100 is shown to be in an installed configuration for allowing usage thereof. The portable toilet 100 is generally designed to be conveniently and suitably used by children aged up to 8 years; however, in some examples, the older aged children may also use the portable toilet 100 without any limitations. The portable toilet 100 is compact and lightweight, for example, the portable toilet 100 is substantially flat when in the transport configuration to enable everyday use.

Figure 2A:
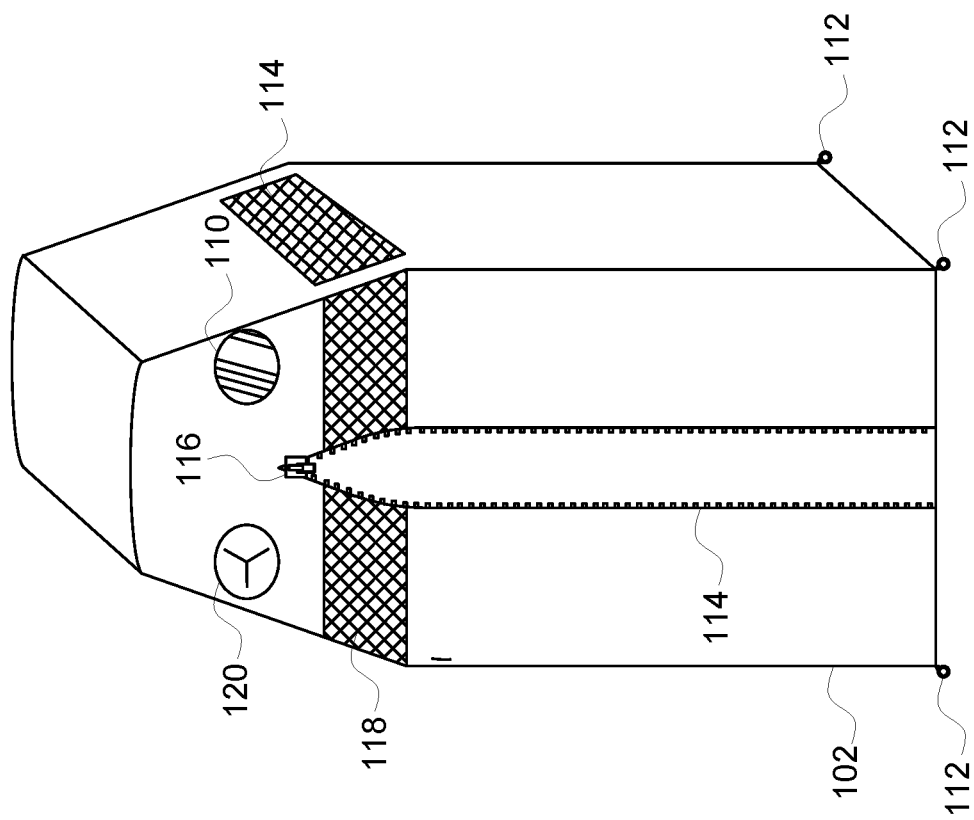
FIG. 2A illustrates a diagrammatic perspective view of the portable toilet 100 arranged in an installed configuration for usage thereof with the zipper 114 closed, with the toilet seat 106 in the compact state attached thereto, in accordance with one or more embodiments of the present invention.
Figure 2B:
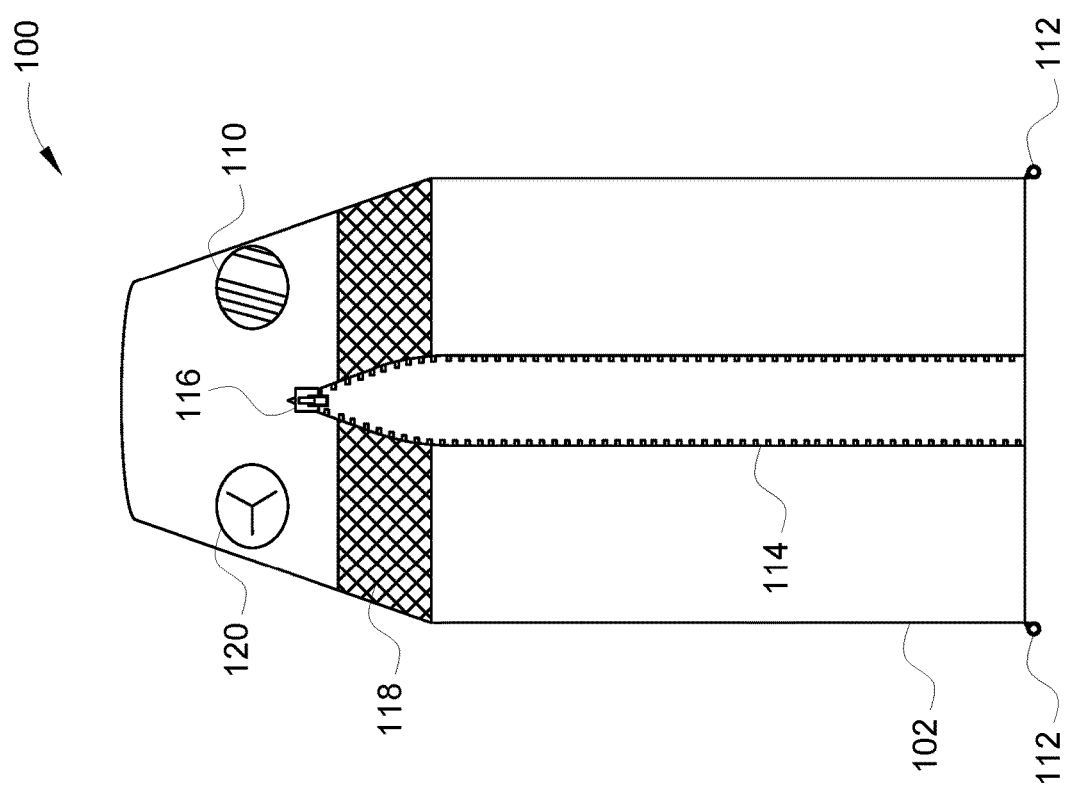
FIG. 2B illustrates a diagrammatic front view of the portable toilet 100 arranged in an installed configuration for usage thereof, in accordance with one or more embodiments of the present invention.

As illustrated in FIGS. 1A-1B, the portable toilet 100 includes a body 102. When the portable toilet 100 is in the transport configuration, the body 102 is folded into a generally oblong shape; however, it may be understood that the body 102 can be designed to be folded into some other shapes for some specific purposes if needed, without any limitations. FIGS. 2A-2B illustrates the portable toilet 100 in installed configuration with the body 102 being unfolded to be in tent shape or the like. According to certain embodiments, the portable toilet 100 is self-erecting, i.e. the portable toilet 100 may be like a pop up tent. In such case, the body 102 when unfolded pops-up into the tent shape. It may be seen that the body 102 expands upon being unpacked from the shape of a compact backpack to the shape of a tent with open space inside. The portable toilet 100, formed as the tent, can be of any suitable shape, including pyramid-shaped, cylindrical or cubic.

The body 102 is made of advantageously breathable, and preferably waterproof material. In an example, the body 102 of the portable toilet 100 may be preferably formed of light-weight material, such as nylon, canvas, polyester fabric and the like. In an exemplary configuration, the portable toilet 100 may be designed to be about 5-6 feet high, and about 4 feet in width and length, when in the installed configuration of tent-shape (as illustrated in FIGS. 2A-2B). In some examples, the outer planar surface of the body 102 can support an aesthetic design, such as a conventional camouflage pattern, a cartoon character pattern or any other aesthetic design for fashion or functional purposes. For instance, the body 102 may be designed in different colors, such a blue or pink to suit the different preferences of boys and girls.

As illustrated in FIGS. 1A-1B, the portable toilet 100 includes straps 104 attached to the body 102 thereof. The straps 104 can be attached to the body 102 by any known suitable means, such as by sewing, use of adhesives, and the like. The straps 104 can be used by a user, like a parent or an any adult accompanying the child, for mounting and carrying the portable toilet 100 in the shape of the backpack on his/her shoulders. As illustrated in FIG. 1B, the portable toilet 100 includes a toilet seat 106 removably attached to the body 102. In the configuration of FIG. 1B, the toilet seat 106 is in a folded state. The toilet seat 106 may be removably attached to the body 102 by using a fastening arrangement 108, such as zipper, catches, Velcro™ or the like. It may be contemplated that the toilet seat 106 can be designed to be folded in any suitable shape. For example, the toilet seat 106 may be folded to be in the shape of a substantially circular pouch which can be easily fastened to the body 102 using the fastening arrangement 108.

In some examples, the portable toilet 100 includes a solar panel, such as the solar panel 110, mounted on the body 102. As may be contemplated, from FIG. 1A, when the portable toilet 100 is being carried by the user over his/her shoulders, the solar panel 110 may be facing the sun to receive the sunlight. Thus, the solar panel 110 may get charged when the portable toilet 100 is being carried as a backpack, and thereby can be used for supplying power at a later stage when required. In various embodiments, the body 102 may have multiple pockets to hold various kind of items and stuff that may be needed to be carried to be used with toilets, such as soaps, tissues, etc., or any other stuff that may be required by the user during of the course of his/her travel.

As noted earlier, FIGS. 2A-2B illustrate the portable toilet 100 in the installed configuration. As illustrated, the portable toilet 100 includes loops 112 provided at its corners to allow for fixing of the portable toilet 100 in the tent form onto the ground, using stakes or the like. Generally, the portable toilet 100 forms a cubic configuration around the base thereof, and may have four loops 112 to allow for installing the portable toilet 100. Further, as illustrated, the portable toilet 100 includes a zipper 114 along with a handle 116 which can be used for closing the portable toilet 100 for privacy. As illustrated, the zipper 114 is running along one side, substantially the entire height of the portable toilet 100 in installed configuration. It may be contemplated that a children using the portable toilet 100 may first step inside, and then may pull down the handle 116 of the zipper 114 in order to close the portable toilet 100.

Further, as illustrated in FIG. 2, the portable toilet 100 may include a mesh 118 formed in the body 102 to allow for ventilation, when the portable toilet 100 is in use. In an exemplary configuration, the mesh 118 may be designed to encircle the entire circumference of the installed portable toilet 100. Further, in some examples, the portable toilet 100 is also provided with a fan 120 installed on a roof of the body 102. The fan 120 may be integrally formed in place with the body 102, or may be carried along in a pocket thereof to be installed when the portable toilet 100 is in the installed configuration. The fan 120 may be electrically connected with the solar panel 110 to receive electric power for operation thereof. Further, in some examples, the portable toilet 100 may be provided with a light source, such as a bulb (not shown) which may be mounted inside the installed portable toilet 100 and be powered by the solar panel 110. It may be understood that the combination of the mesh 118 and the fan 120, and the light source, may be sufficient to create enough ventilation and light inside the installed portable toilet 100, which may help the children to not feel suffocated or be afraid of dark during use thereof.

Figure 3B:
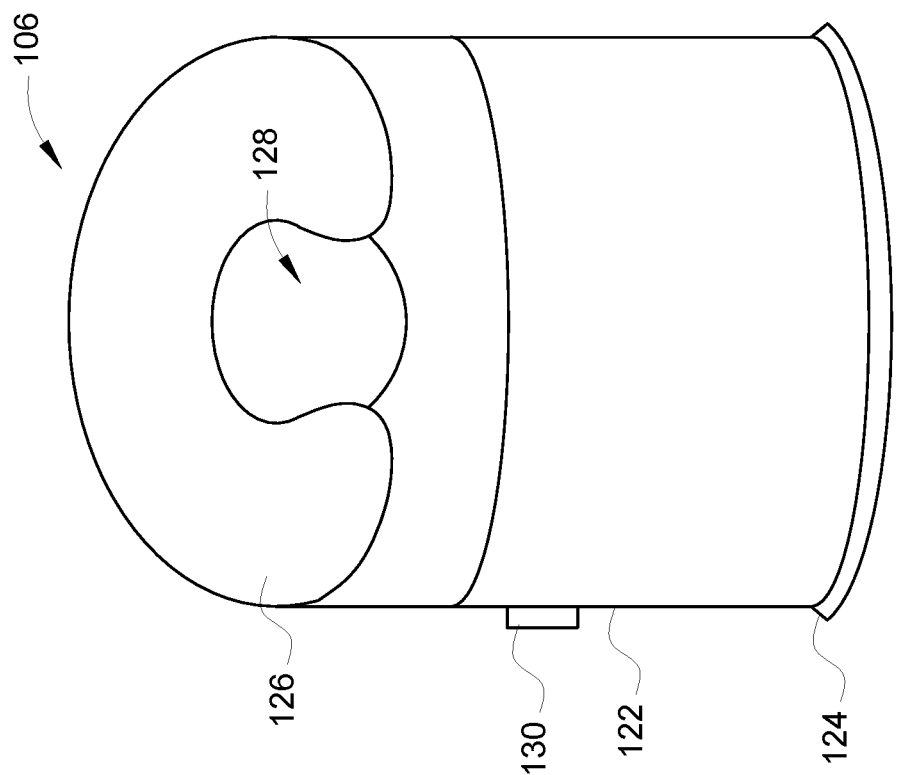
FIG. 3B illustrates a diagrammatic views of the installed toilet seat 106 in extended state, in accordance with one or more embodiments of the present invention.
Figure 3A:
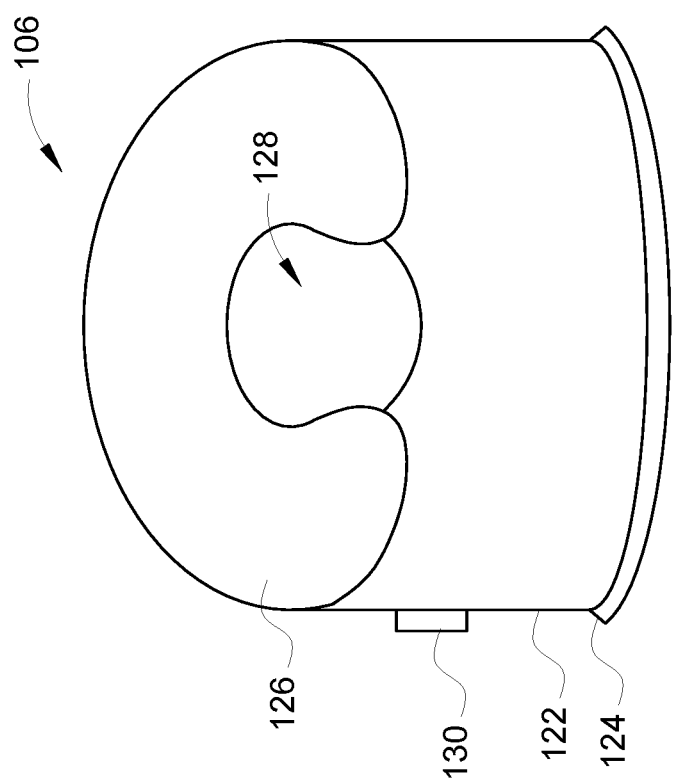
FIG. 3A illustrates a diagrammatic views of the installed toilet seat 106 in reduced state, in accordance with one or more embodiments of the present invention.

Moving on, FIGS. 3A-3B illustrate the toilet seat 106 in its installed state. As may be understood, the toilet seat 106 may be unfolded and locked into place into the installed state for use thereof. It may be understood the collapsible toilet seat 106 may be first removed from the body 102, put together in the installed state, and manually placed inside the portable toilet 100 in installed tent configuration or any other privacy screen. Many arrangements for folded toilet seats are known in the art and thus have not been described herein for the brevity of the disclosure. In one or more examples, the toilet seat 106 may be formed primarily of acrylonitrile butadiene styrene (ABS) plastic, to provide a lightweight yet sturdy structure.

The toilet seat 106 may generally be in the shape of a regular toilet seat. In an embodiment, the toilet seat 106 may have an adjustable base 122. The adjustable base 122 may be contracted or expanded to dispose the toilet seat 106 in a small size configuration (as shown in FIG. 3A) and a large size configuration (as shown in FIG. 3B), respectively. As may be understood, these different small and large configurations of the toilet seat 106 may be implemented for use by short and tall children respectively, in order to cater to different aged group children. In some examples, the toilet seat 106 may be provided with a retractable support 124 for providing stability thereto when being used in large size configuration. Further, as illustrated, the toilet seat 106 may have a seating surface 126 and an opening therein 128 to receive the excreta and urine. The toilet seat 106 is designed to allow use of eco-friendly disposable plastic bags (not shown) which can be installed in the opening 128, for receiving excrement and/or urine from the child in order to be later disposed-off. The toilet seat 106 may include a dispenser 130 for disposable plastic bags installed on a side thereof. The disposable bag may be installed to the toilet seat 106 when folded up, to simplify and speed up the installation process.

In operation, the present portable toilet 100 is designed to be transported to a remote location, where the body 102 is expanded into a stable, upright position. The toilet seat 106 is detached, and is placed in a horizontal level inside the installed portable toilet. The disposable bag is used under the toilet seat 106, thus allowing easy cleanup after bathroom duties. Upon removal, the body 102 is collapsed and held shut by the use of fasteners, such as Velcro™. The portable toilet 100 folds flat in the shape of a backpack and is held using the straps 104 for ease of carrying, storage and transport. The portable toilet 100 can be popped up and used in place as a portable pottie for children, or even by adults. The compact and lightweight nature of the portable toilet 100 enables it to be used every day, without being burdensome. The portable toilet 100 of the present invention is particularly used for school outing, family camps, and the like situations.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense in any manner.

What is claimed is:

1. A portable toilet comprising:
   a body having a folded state and an unfolded state, wherein, in the folded state of the body, the portable toilet is disposed into shape of a backpack, and wherein, in the unfolded state of the body, the portable toilet is disposed into shape of a tent; and
   a toilet seat attached to the body in the folded state thereof, wherein the toilet seat is unfolded into an installed state, after removal from the body, for use thereof; and
   one or more solar panels mounted onto said body such that said one or more solar panels face the sun to receive sunlight for generating electric power when said portable toilet is disposed into shape of the backpack and being carried by a user.

2. The portable toilet of claim 1, wherein the body is made of waterproof material.

3. The portable toilet of claim 1, wherein the body is made of one or combination of nylon, canvas and polyester fabric.

4. The portable toilet of claim 1 further comprising straps attached to the body for aiding with carrying of the portable toilet when disposed into shape of the backpack.

5. The portable toilet of claim 1, wherein the toilet seat is removably attached to the body using one or more of zipper, catches and Velcro™.

6. The portable toilet of claim 1 further comprising loops provided with the body to allow for fixing of the portable toilet when disposed into shape of the tent onto the ground.

7. The portable toilet of claim 1 further comprising a zipper for opening and closing of the portable toilet when disposed into shape of the tent.

8. The portable toilet of claim 1 further comprising a mesh formed in the body to allow for ventilation inside the portable toilet, when disposed into shape of the tent.

9. The portable toilet of claim 1 further comprising a fan mounted with the body and operated by the generated electric power to provide ventilation for the portable toilet when disposed into shape of the tent.

10. The portable toilet of claim 1 further comprising a light source mounted with the body to be positioned inside the portable toilet when disposed into shape of the tent.

11. The portable toilet of claim 1, wherein the toilet seat has an adjustable base to change height in the installed state thereof.

12. The portable toilet of claim 1 further comprising a mesh formed in the body to allow for ventilation inside the portable toilet, when disposed into shape of the tent.

* * * * *